(12) United States Patent
Kunert et al.

(10) Patent No.: US 6,391,355 B1
(45) Date of Patent: *May 21, 2002

(54) METHOD FOR MAKING CRUNCHY BACON BITS

(75) Inventors: Gale F. Kunert; Richard M. Herreid, both of Austin, MN (US)

(73) Assignee: Hormel Foods, LLC, Austin, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/474,424

(22) Filed: Dec. 29, 1999

(51) Int. Cl.$^7$ .............................. A23L 1/311; A23L 1/314

(52) U.S. Cl. .................. 426/264; 426/464; 426/473; 426/510; 426/641; 426/646

(58) Field of Search ................................ 426/264, 641, 426/646, 464, 473, 509, 510, 511, 518, 519

(56) References Cited

U.S. PATENT DOCUMENTS

| | | | |
|---|---|---|---|
| 3,595,679 A | | 7/1971 | Schoch et al. |
| 3,873,755 A | | 3/1975 | McKay ........................ 426/523 |
| 3,890,451 A | | 6/1975 | Keszler ........................ 426/264 |
| 3,901,981 A | | 8/1975 | Draudt ........................ 426/266 |
| 3,997,672 A | * | 12/1976 | Stead et al. ............. 426/646 X |
| 4,132,810 A | | 1/1979 | Knutson ...................... 426/104 |
| 4,169,161 A | | 9/1979 | Leidy et al. .................. 426/89 |
| 4,446,159 A | | 5/1984 | Roth ........................... 426/249 |
| 4,552,768 A | * | 11/1985 | Olander .................. 426/646 X |
| 5,567,460 A | * | 10/1996 | Afman ........................ 426/264 |
| 5,637,342 A | * | 6/1997 | Brooks et al. .......... 426/510 X |
| 5,798,133 A | | 8/1998 | Kunert ........................ 426/438 |
| 5,837,305 A | | 11/1998 | Kunert ........................ 426/438 |

* cited by examiner

*Primary Examiner*—Arthur L. Corbin
(74) *Attorney, Agent, or Firm*—Mau & Krull, P.A.

(57) ABSTRACT

A method of making crunchy bacon bits from raw bellies. The raw bellies are sized and mixed with water and curing ingredients to form a product mixture. The product mixture is placed in a vessel with agitation. Then, the mixture is heated to above 120° F. wherein protein within the product mixture is substantially denatured. The product mixture is then cooked under a vacuum until the product mixture attains a product moisture content of 5% or less and a water activity level of 0.30 or less.

22 Claims, No Drawings

METHOD FOR MAKING CRUNCHY BACON BITS

BACKGROUND OF THE INVENTION

1. Field of the Invention

This invention relates generally to a process for making bacon bits and more particularly to a process for making crunchy bacon bits comprising cooking the bacon under a vacuum to a desired water activity level.

2. Description of the Prior Art

Bacon bits are used to garnish a variety of foods such as potatoes, salads, and vegetables. In addition, bacon bits may also be used as an ingredient in various food dishes such as egg dishes and sauces. Imitation bacon bits may be made from vegetable protein to resemble the cooked bacon. Real bacon bits are typically made from grinding raw bacon and cooking it; from cooking the bacon, then chilling the bacon and passing the bacon through a grinder or dicer; or from sizing the raw bellies, forming a product mixture, heating the product mixture, and further processing the product mixture resulting in a water activity level of 0.85 or less.

It is the goal of any process for making bacon bits to have the bacon bits appear as true pieces of bacon and not as ground clumps of bacon. Further, it is desirable that the bacon bits have a uniform appearance and a dark red color.

One example of a bacon finishing method is found in U.S. Pat. No. 4,552,768. It is well-known in the art to prepare bacon bits by taking bacon ends and pieces, which remain from other processes, and grinding them through a ⅜ inch diameter plate into a jacketed steam kettle. Then, the temperature is raised to 220° F. and is cooked under a vacuum to a water activity level of approximately 0.75. The oil is then drained from the bacon ends and pieces. The oil is then further removed by pressing the bacon ends and pieces. Finally, the bacon ends and pieces are chilled and packaged.

In U.S. Pat. No. 5,798,133, the bacon bits are sized, mixed with water and curing ingredients to form a product mixture, and then heated to above 120° F. wherein protein within the product mixture is substantially denatured. The product is then mixed further and then heated to at least 180° F. Then, the product mixture is further processed to a water activity level of 0.85 or less.

In U.S. Pat. No. 5,837,305, the bacon bits are cooked sufficiently to bring its water activity level to a first level from 0.7–0.9 and preferably from 0.82–0.85. Then, the bacon bits are fried to bring its water activity level to a second level from 0.7–0.8 and preferably from 0.72–0.76.

While such processes produce very acceptable bacon bits, there are sometimes problems in obtaining the desired color, which is a dark red color. Still further, it is always desirable to produce a product with better texture, that is being crisper and more brittle, but not too hard. The present invention addresses the problems associated with the prior art and provides for a new and improved process to make crunchy bacon bits.

SUMMARY OF THE INVENTION

The present invention is a method for making crunchy bacon bits from raw bellies. In a first embodiment, the method includes sizing the raw bellies and then mixing water, the sized bellies, curing ingredients, and encapsulated salt to form a product mixture. The product mixture is placed in a first vessel. While agitating the first vessel, the product mixture is heated, wherein protein within the product mixture is substantially denatured. The product mixture is pumped to a second vessel and the temperature is increased. A vacuum is then applied to the second vessel and cooking the product mixture is continued until the temperature is increased, wherein the product mixture has a water activity level of 0.30 or less. In a preferred embodiment, the product mixture is cooked under pressure within the second vessel, the temperature is increased to 250–260° F. (15–20 pounds steam pressure) and the product mixture remains under pressure for 30–60 minutes.

In a second embodiment, the method includes sizing the raw bellies and then mixing water, the sized bellies, and curing ingredients to form a product mixture. The product mixture is placed in a vessel. While agitating the vessel, the product mixture is heated, wherein protein within the product mixture is substantially denatured. After the protein has been denatured, salt is added to the product mixture. In a preferred embodiment, when salt is added during this step of the process, it is not necessary that the salt be encapsulated. The temperature is increased, and a vacuum is then applied to the vessel and cooking the product mixture is continued until the temperature is increased, wherein the product mixture has a water activity level of 0.30 or less. In a preferred embodiment, before the vacuum is applied, the product mixture is cooked under pressure within the vessel, the temperature is increased to 250–260° F. (15–20 pounds steam pressure) and the product mixture remains under pressure for 30–60 minutes after the salt is added to the product mixture.

In another embodiment, the method includes sizing the raw bellies and then mixing water, the sized bellies, and curing ingredients to form a product mixture. The product mixture is placed in a vessel. While agitating the vessel, the product mixture is heated, wherein protein within the product mixture is substantially denatured. The temperature is increased, and a vacuum is then applied to the vessel. Cooking the product mixture is continued until the temperature is increased, wherein the product mixture has a water activity level of 0.30 or less. In a preferred embodiment, encapsulated salt may be added to the product mixture when the product mixture is formed, or salt may be added to the product mixture after the protein is denatured. When salt is added after the protein is denatured, it is not necessary that the salt be encapsulated. Also in a preferred embodiment, more than one vessel may be used in the process. A first vessel may be used to agitate and heat the product mixture and a second vessel may be used to apply the vacuum. In a preferred embodiment, the product mixture is heated to 140–145° F. and cooked under pressure while agitating the vessel and then the temperature is increased to 250–260° F. (15–20 pounds steam pressure) for 30–60 minutes.

DETAILED DESCRIPTION OF THE PREFERRED EMBODIMENT

The present invention is a method for making crunchy bacon bits using raw bellies. The raw bellies that are utilized may be either whole or trimmings. When used in this application, raw bellies will refer to both whole bellies as well as belly trim.

In the preferred embodiment, raw bellies are used as an initial source of product. An advantage of using raw bellies as an initial source of product is that uniform salt levels are achieved throughout the product mixture and the salt level may be adjusted to give a desired level in the finished bacon bits. However, it is understood that bacon may be used instead of using raw bellies. Presently, when many sources of bacon ends and pieces are used to make bacon bits, different pickle formulations are used and the finished salt level varies. This is avoided by using raw bellies in the formulation.

First, the raw bellies are either sliced and ground to approximately one inch or diced using an appropriate device such as the Urschel Model M Dicer. The raw bellies are then placed in a blender where they are mixed for 20 minutes with cure ingredients to form a product mixture. The cure ingredients may include water, encapsulated salt, sugar, dextrose, sodium erythobate, sodium nitrite, and smoke flavoring. It is of course understood that any suitable amounts of these ingredients may be used. The encapsulated salt is encased in a high temperature fat which typically will melt at 140° F. An example of such salt is Cap-Shure® salt by Balchem Corporation. Since the pork belly protein is denatured at approximately 120° F., the protein is denatured before the salt is released. The use of encapsulated salt in the present invention allows the product mixture to reach the temperature of 120° F. without the salt contacting the protein. At 120° F., the protein is denatured and salt may then be added without the clumping that occurs when salt is added prior to the denaturing of the protein. It is possible to utilize the present invention without the use of encapsulated salt. In those instances, the salt would be added after the protein has been substantially denatured. It is appreciated that either method would be successful. However, the use of encapsulated salt makes the process a one-step process rather than a two-step process, thereby simplifying production.

The product mixture is then moved to a steam jacketed vessel with agitation or a blender, which are well-known in the art. It is understood that the blender and the vessel may be one in the same. However, since the blender does not need to be able to heat under a vacuum, they could be different apparatus. Bacon fat is added to the product mixture at this point. The bacon fat is typically added at 100–140° F. or even higher to 180° F. Any suitable proportion of bacon fat to raw bellies may be used. Applicants have found that adding from 20–25% bacon fat is preferred. The addition of bacon fat reduces the amount of cook-on and adds flavor to the finished product. After the bacon fat has been added, the product mixture is heated to 140–145° F. Once this temperature range has been reached, the temperature is held and the product mixture is agitated for a period of time. This temperature range allows the protein to be denatured before the encapsulated salt is released. The applicants have found that agitation for 30–60 minutes is preferred. The purpose of agitation is to break up particles of the bellies that may have become attached to each other. The agitation further assists in uniformly heating the product mixture and setting the color. The longer the agitation, the better the separation of the particles. The range of 140–145° F. is preferred, but a temperature in the range of 120–180° F. is acceptable. As previously discussed, the protein is typically denatured at 120° F. Therefore, the salt should be encapsulated in a fat that melts at a temperature above 120° F. The steps discussed thus far mirror the initial steps of the method for making bacon bits from raw bellies disclosed in U.S. Pat. No. 5,798,133.

The product mixture is then pumped to a pressure/vacuum steam vessel with agitation, and the temperature is increased to 250–260° F., which is approximately 15–20 pounds of steam pressure. The agitation prevents the bacon bits from settling against the heat source, thus heating the bacon bits more uniformly. Using pressure in the vessel is an optional step. If this step is used, the product mixture is cooked under pressure for approximately 30–60 minutes. Although cooking the product mixture under pressure is optional, it is used to improve the aesthetic appearance of the bacon bits because it removes some of the fat eyes or fat chunks in the bacon bits. If pressure is not used, a lower temperature such as 210–220° F. may be used. Then the pressure, if used, is released and a vacuum is applied. In this method, using a vacuum is not an optional step. Using pressure and then a vacuum allows the product mixture to cook in the absence of oxygen, which helps the product mixture maintain its color. Typically, the vacuum would be about 18–28 inches Hg. While in the vacuum vessel, the product mixture is cooked at 25–30 pounds steam pressure for 30–60 minutes. Although steam pressure is used as a heat source in this step of the preferred embodiment, any other comparable heat source would be acceptable. When the vacuum is added, the product temperature drops to approximately 160–165° F., but as the product cooks, the temperature rises to approximately 270° F. It is during this step that the product moisture drops to 5% or less and has a water activity level of 0.30 or less. This step is significant because bacon bits normally have a water activity level of 0.75–0.80. If the water activity level of the product mixture is 0.40, the product mixture is more rubbery than crunchy. A water activity level of 0.35 is marginal. An advantage of using this step over using a deep fat fryer is that there is less oxidation of the product mixture, therefore reducing the burnt flavor. The use of a vacuum enables the moisture level to decrease without burning the product mixture and it prevents getting hard nuggets.

The vessel may then be opened and flavoring may be added to the product mixture. Any suitable flavoring may be used. The product mixture is mixed for about 2 minutes. Then, the product mixture is centrifuged and sized in order to separate the different particle sizes. The centrifuge removes some of the excess oil from the product mixture. The centrifuge is used in lieu of a press to remove the excess oil. Optionally, the dry flavoring may be added after the product mixture is centrifuged. The finer sizes may be used as seasoning and the bits may be jarred for salad topping.

The method of the present invention for making crunchy bacon bits may also be used for cooking other flavored meats such as pepperoni and ham. It may also be used for making dried seasonings.

The above specification, examples and data provide a complete description of the manufacture and use of the composition of the invention. Since many embodiments of the invention can be made without departing from the spirit and scope of the invention, the invention resides in the claims hereinafter appended.

We claim:
1. A method for making crunchy bacon bits from raw bellies, comprising the steps of:
   a. sizing the raw bellies;
   b. mixing water, sized bellies, curing ingredients, and encapsulated salt to form a product mixture;
   c. placing the product mixture in a first vessel;
   d. heating the product mixture to a temperature while maintaining agitation, wherein protein within the product mixture is substantially denatured;
   e. pumping the product mixture to a second vessel, increasing the temperature within the second vessel and cooking the product mixture under pressure therein;
   f. applying a vacuum to the second vessel while containing cooking the product mixture therein; and
   g. increasing the temperature as the product mixture cooks, wherein the cooked product mixture has a water activity level of 0.30 or less.

2. The method of claim 1, further comprising centrifuging, sizing, and packaging the product mixture.

3. The method of claim 1, wherein 20 to 25% by weight bacon fat based upon the raw belly weight, is added to the product mixture in step (c).

4. The method of claim 3, wherein the product mixture is heated to 140 to 145° F. and agitation is maintained for 30 to 60 minutes in step (d).

5. The method of claim 4, wherein the temperature in step (e) is increased to 250 to 260° F. (15 to 20 lbs. steam pressure) and the product mixture remains under pressure for 30 to 60 minutes in step (e).

6. The method of claim 5, wherein the temperature of step (g) is increased to approximately 270° F.

7. The method of claim 1, wherein the product mixture of step (g) has a moisture content of 5% or less.

8. A method for making crunchy bacon bits from raw bellies, comprising the steps of:
   a. sizing the raw bellies;
   b. mixing water, sized bellies, and curing ingredients to form a product mixture;
   c. placing the product mixture in a vessel;
   d. heating the product mixture to a temperature while maintaining agitation, thereby increasing the temperature within the vessel, wherein protein within the product mixture is substantially denatured;
   e. adding salt to the product mixture in the vessel;
   f. cooking the product mixture under pressure in the vessel;
   g. applying a vacuum to the vessel while containing cooking the product mixture therein; and
   h. increasing the temperature as the product mixture cooks, wherein the cooked product mixture has a water activity level of 0.30 or less.

9. The method of claim 8, further comprising centrifuging, sizing, and packaging the product mixture.

10. The method of claim 8, wherein 20 to 25% by weight bacon fat based upon the raw belly weight, is added to the product mixture in step (c).

11. The method of claim 10, wherein the agitation of step (d) is maintained for 30 to 60 minutes and the product mixture is heated to 140 to 145° F.

12. The method of claim 11, wherein the temperature in step (f) is increased to 250 to 260° F. (15 to 20 lbs. steam pressure), and the product mixture remains under pressure for 30 to 60 minutes.

13. The method of claim 12, wherein the product mixture is cooked at 25 to 30 lbs. steam pressure for 30 to 60 minutes in step (g).

14. The method of claim 13, wherein the temperature is increased to approximately 270° F. in step (g).

15. The method of claim 14, wherein the product mixture of step (h) has a moisture content of 5% or less.

16. A method for making crunchy bacon bits from raw bellies, comprising the steps of:
   a. sizing the raw bellies;
   b. mixing water, sized bellies, and curing ingredients to form a product mixture;
   c. placing the product mixture in a vessel;
   d. heating the product mixture to a temperature while maintaining agitation, thereby increasing the temperature within the vessel, wherein protein within the product mixture is substantially denatured;
   e. cooking the product mixture under pressure in the vessel;
   f. applying a vacuum to the vessel while containing cooking the product mixture therein; and
   g. increasing the temperature as the product mixture cooks, wherein the cooked product mixture has a water activity level of 0.30 or less.

17. The method of claim 16, wherein a first vessel is used to agitate and heat the product mixture and a second vessel is used to apply the vacuum.

18. The method of claim 16, wherein encapsulated salt is added to the product mixture in step (b).

19. The method of claim 16, wherein salt is added to the product mixture after step (d) and before step (f).

20. The method of claim 16, wherein 20 to 25% by weight bacon fat based upon the raw belly weight, is added to the product mixture in step (c).

21. The method of claim 16, wherein the product mixture is heated to 140 to 145° F. and cooked under pressure in step (e) and then the temperature is increased to 250 to 260° F. (15 to 20 lbs. steam pressure) for 30 to 60 minutes.

22. The method of claim 16, wherein the product mixture of step (g) has a moisture content of 5% or less.

* * * * *

UNITED STATES PATENT AND TRADEMARK OFFICE
CERTIFICATE OF CORRECTION

PATENT NO. : 6,391,355 B1
DATED : May 21, 2002
INVENTOR(S) : Gale F. Kunert and Richard M. Herreid It is certified that error appears in the above-identified patent and that said Letters Patent is hereby corrected as shown below:

<u>Column 4,</u>
Lines 63-64, delete "containing" and insert therefore -- continuing --;

<u>Column 5,</u>
Line 32, delete "containing" and insert therefore -- continuing --;

<u>Column 6,</u>
Line 23, delete "containing" and insert therefore -- continuing --; and
Line 37, insert -- , -- after "fat".

Signed and Sealed this

Eighth Day of October, 2002

*Attest:*

*Attesting Officer*

JAMES E. ROGAN
*Director of the United States Patent and Trademark Office*